United States Patent [19]
Kimura

[11] Patent Number: 4,914,524
[45] Date of Patent: Apr. 3, 1990

[54] IMAGE READING APPARATUS AND METHOD

[75] Inventor: Ken Kimura, Kanagawa, Japan

[73] Assignee: Sony Corporation, Tokyo, Japan

[21] Appl. No.: 221,665

[22] Filed: Jul. 20, 1988

[30] Foreign Application Priority Data

Jul. 27, 1987 [JP] Japan .................. 62-188227

[51] Int. Cl.⁴ .............................................. H04N 1/40
[52] U.S. Cl. ..................................... 358/462; 358/457; 358/464; 358/466
[58] Field of Search ............... 358/283, 282, 294, 280, 358/462, 457, 464, 466

[56] References Cited

U.S. PATENT DOCUMENTS

| | | |
|---|---|---|
| 4,342,051 | 4/1980 | Suzuki et al. |
| 4,495,522 | 7/1982 | Matsunawa et al. |
| 4,628,366 | 12/1986 | Yamada ........................... 358/283 |
| 4,709,274 | 11/1987 | Tanioka ........................... 358/283 |
| 4,723,173 | 2/1988 | Tanioka ........................... 358/282 |
| 4,729,035 | 3/1988 | Tanioka ........................... 358/282 |

FOREIGN PATENT DOCUMENTS 2067377 12/1980 United Kingdom.
2103449 6/1982 United Kingdom.

Primary Examiner—Howard W. Britton
Attorney, Agent, or Firm—Philip M. Shaw, Jr.

[57] ABSTRACT

An image reading apparatus for converting an image on a document having a white/black text area into a display signal. An image reader scans pixels forming the image to produce a read signal having a level corresponding to the brightness density of each of the scanned pixels. The read image is compared with a dither matrix data signal and converted into a dither converted signal. The read image is also compared with a threshold value and converted into a binary signal having a first level representing a white pixel and a second level representing a black pixel. A discrimination circuit receives the binary signal for producing a detection signal when the white/black text area is scanned. Upon occurrence of the detection signal, the dither converted signal is mixed with the binary signal to form the display signal.

28 Claims, 10 Drawing Sheets

FIG. 2A
PRIOR ART
FIG. 2B
PRIOR ART
FIG. 2C
PRIOR ART
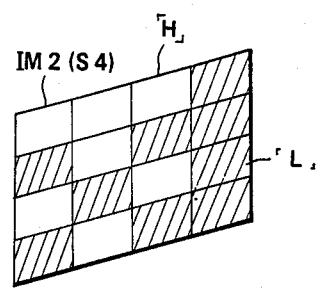
FIG. 3
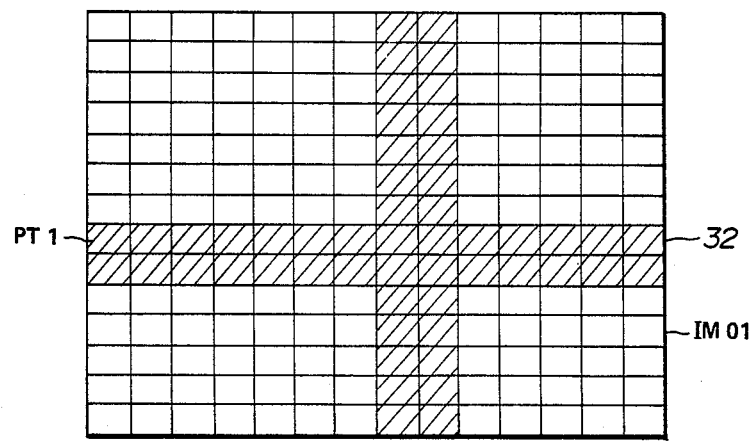

IMAGE READING APPARATUS AND METHOD

BACKGROUND OF THE INVENTION

This invention relates to an image reading apparatus and method suitable for use with facsimilies, copiers, image scanners or the like.

Pseudo halftone methods have been employed to reproduce halftone gradations by changing the density of black or white pixels (picture elements). A typical pseudo halftone method is suggested by T. H. Morrin in his paper entitled "A Black-White Representation of a Gray-Scale Picture" published Feb., 1974, in IEEE TRANSACTIONS ON COMPUTER, C-23 at pp. 184–186. Another pseudo halftone method is suggested by B. E. Bayer in his paper entitled "An Optimum Method for Two-Level Rendition of Continuous-Tone Pictures" published in 1973, in ICC CONF RECOND at pp. 2611–2615. These pseudo halftone methods, which convert a read image into a display signal using one-bit to represent each pixel, permit the use of a simple signal processing technique and their applications to printers, facsimilies or the like displaying white/black images. Although such conventional pseudo halftone methods have a capacity for good tone reproduction characteristics, they exhibit poor resolution in some cases, particularly in line-copy reproduction, as described later in greater detail.

SUMMARY OF THE INVENTION

It is a main object of the invention to provide an improved image reading apparatus which can provide good resolution as well as good halftone reproduction characteristics in line-copy reproduction.

There is provided, in accordance with the invention, an image reading apparatus for converting an image on a document having a white/black text area into a display signal. The apparatus comprises an image reader for scanning pixels forming the image to produce a read signal having a level corresponding to the brightness density of each of the scanned pixels and means for generating a dither matrix data signal. The read signal is compared with the dither matrix data signal and converted into a dither converted signal. A binary converter compares the read signal with a threshold level to produce a binary signal having a first level representing a white pixel, and a second level representing a black pixel. A discrimination circuit receives the binary signal for producing a detection signal when the white/black text area is scanned. The apparatus also includes means responsive to the detection signal for mixing the dither converted signal and the binary signal to form the display signal.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIGS. 2A, 2B and 2C are diagrams used in explaining the dither conversion process made in the image reading apparatus of FIG. 1;

FIG. 3 is a diagram showing an example of the image to be read;

FIGS. 4A and 4B are diagrams showing two different dither matrix types;

DETAILED DESCRIPTION OF THE INVENTION

Figure 1:
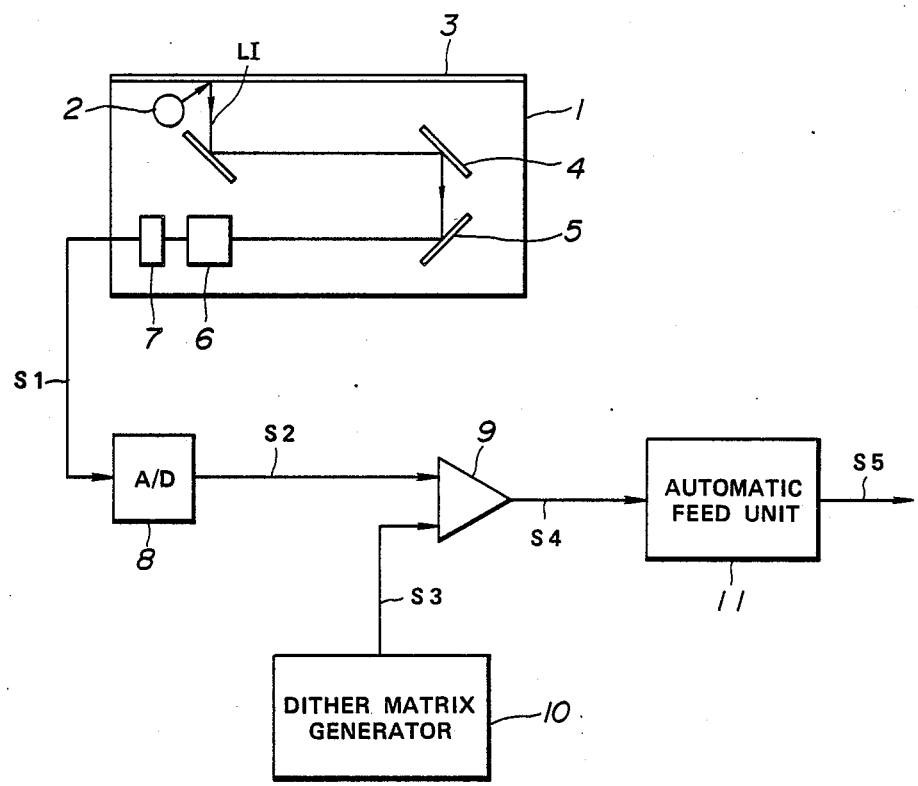
FIG. 1 is a schematic block diagram showing a conventional image reading apparatus employing an organizational dither method.

Prior to the description of the preferred embodiment of the invention, the prior art image reading apparatus of FIG. 1 is briefly described in order to specifically point out the difficulties attendant thereon.

Referring to FIG. 1, the conventional image reading apparatus, which can reduce the organizational dither method into practice, includes an image scanner 1 by which documents are entered into the system. The scanner 1 comprises a luminous source 2 such as a fluorescent lamp. A light beam, emitted from the luminous source 2, is reflected on an original document 3 placed face down on the image scanner 1. The reflected light beam forms a luminous read image signal L1 which is reflected by mirrors 4 and 5. The reflected luminous read image signal travels through a condenser lens 6 to a photoelectric conversion element 7 such as a charge coupled device. The photoelectric conversion element 7 converts the luminous read image signal L1 into an electrical read image signal S1 corresponding to one line segment of picture elements (pixels). The electrical read image signal S1 is fed to an analog-to-digital converter 8 which converts it into a corresponding digital read image signal S2 having 4 bits per one pixel. For example, the digital read image signal S2 includes read image data IMO of a unit matrix having 4×4 pixels, as shown in FIG. 2A.

The digital read image signal S2 is fed from the analog-to-digital converter 8 to one input of a comparator 9 having another input supplied with a dither matrix data signal S3 produced from a dither matrix data generator 10. The dither matrix data signal S3 includes dither matrix data IM1 having distributed 16 gray-level (brightness density) threshold values "0" to "15" assigned for the respective 4×4 pixels of a unit matrix, as shown in FIG. 2B. The comparator 9 compares the read image data IMO with the dither matrix data IM1 for each of the 4×4 pixels. The comparator 9 produces a dither converted display signal S4 which is at its high level "H" indicating a white pixel when the pixel brightness density value included in the read image data IMO is equal to or greater than the corresponding brightness density threshold value distributed in the dither matrix data IM1. The dither converted display signal S4 is at its low level "L" indicating a black pixel when the pixel brightness density value is less than the corresponding brightness density threshold value. FIG. 2C illustrates a black/white pattern IM2 indicated by the dither converted display signal S4 produced as a result of comparisons made in the comparator 9. The dither converted display signal S4 is fed to an automatic feed unit 11 which produces an output display signal S5 having one bit per one pixel.

Although the conventional organizational dither method is satisfactory for applications where good halftone reproduction characteristics are essential, it reproduces images with poor resolution particularly in line-copy reproduction. This stems mainly from the fact that the dither matrix data have brightness density threshold values different even for the pixels having the same brightness density so that they are not detected as the same color (white or black). Accordingly, the pattern on the read image data IMO is not reproduced at the corresponding position on the black/white pattern IM2 with high fidelity. Second, the manner in which the resolution is reduced is dependent on the manner in which the brightness density threshold values are distributed in the dither matrix data since a change in the manner where the brightness density threshold values are distributed in the dither matrix data causes a change of the disposition of the white and black pixels on the white/black pattern IM2.

Figures 4A, 4B:
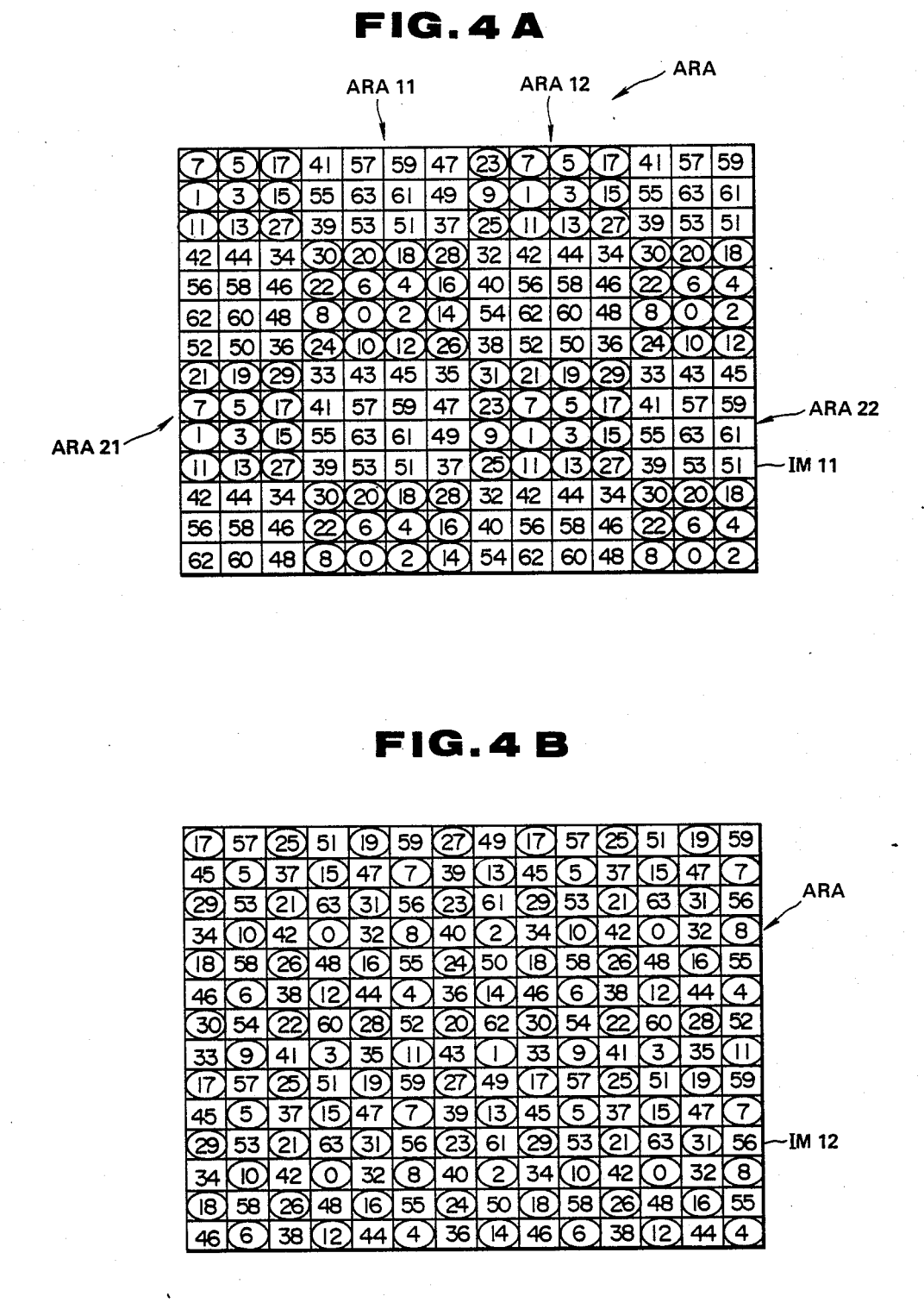
Figure 5A:
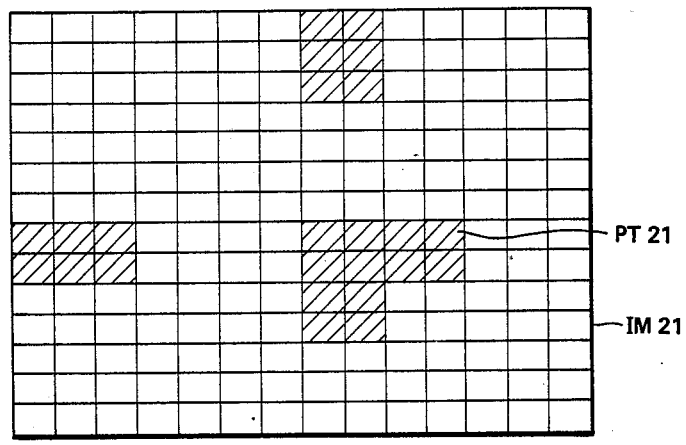
FIG. 5A is a diagram showing a display image produced with the use of the concentrated dither matrix of FIG. 4A.

FIG. 5A shows a converted pattern PT21 produced on the display image 1M21 when a cross pattern PT1 on the read image 1M01 (FIG. 3) is processed according to the organizational dither method employing a concentrated dither matrix IM11, as shown in FIG. 4A, where similar brightness density threshold values are concentrated on the dither matrix. The concentrated dither matrix IM11 is arranged to have unit areas ARA each corresponding to 8×8 pixels. The unit area is divided into four segments ARA11, ARA12, ARA21 and ARA22 each corresponding to 4×4 pixels. The diagonally adjacent segments ARA11 and ARA22 have smaller brightness density threshold values "0" to "31". A pixel having brightness density value equal to or less than the brightness density threshold value "31" is determined as a black pixel. The diagonally adjacent segments ARA11 and ARA22 have greater brightness density threshold values "32" to "63". A pixel having a brightness density value equal to or greater than the brightness density threshold value "32" is determined as a white pixel. With the use of such a concentrated dither matrix IM11 as shown in FIG. 4A the display image has a resolution power which is deteriorated to a great extent although some persons may perceive smooth brightness density variations on the display image. This will be described in greater detail. While the pixels which form the cross pattern PT1 on the read image IMO1 of FIG. 3, have the same brightness density level of 32, only part of the pixels are converted into black pixels on the display image IM21. Accordingly, the pattern PT21 on the display image IM21 is broken. This exhibits a great deterioration of the resolution power.

Figure 5B:
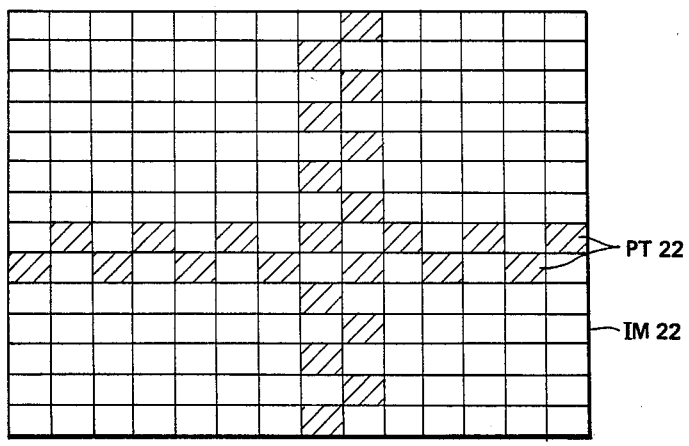
FIG. 5B is a diagram showing a display image produced with the use of the distributed dither matrix of FIG. 4B.

FIG. 5B shows a converted pattern PT22 produced on the display image IM21 when the crossing line pattern PT1 on the read image IMO1 (FIG. 3) is processed according to the organizational dither method employing a distributed dither matrix, as shown in FIG. 4B, where small and great brightness density threshold values are distributed uniformly on the dither matrix. The distributed dither matrix IM12 is arranged to have unit areas ARA each corresponding to 8×8 pixels. Each of the unit areas has a lower brightness density value arranged among greater brightness density threshold values and has a greater brightness threshold value among smaller brightness threshold values. With the use of such a distributed dither matrix IM12 as shown in FIG. 4B, only part of the pixels, which form the cross pattern PT1 on the read image IMO1 of FIG. 3, are converted into black pixels arranged alternatively on the display image IM21, as shown in FIG. 5B, causing resolution power deterioration. Since the converted pattern PT22 is similar to the pattern PT1 on the read image IMO1, the extent of deterioration of the resolution power is smaller than is obtained with the use of the concentrated dither matrix of FIG. 4A. It can be seen from a comparison of FIGS. 5A and 5B that the resolution power with which the image is reproduced is dependent greatly on the arrangement of the dither matrix used in the organizational dither method.

As described above, the organizational dither method is satisfactory in reading halftone pictures or the like where tone changes are small over a wide range; however, it cannot provide good resolution in line-copy reproduction (e.g., text matter, drawings, etc.).

Figure 6:
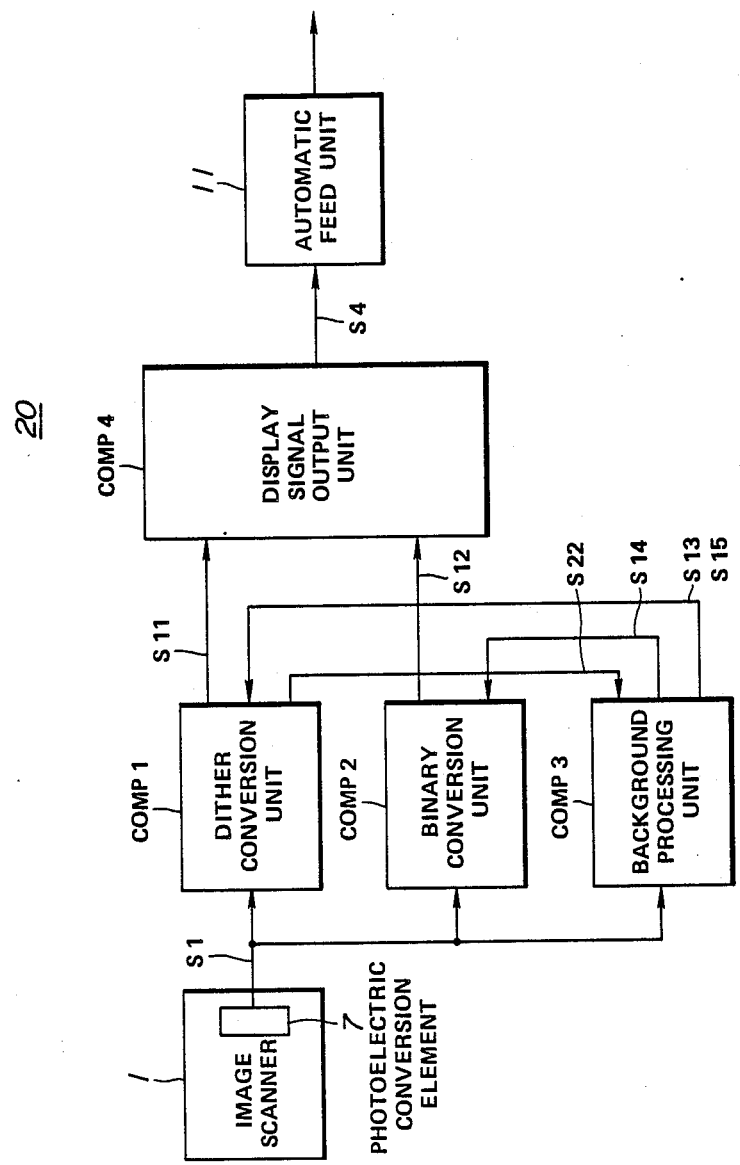
FIG. 6 is a schematic block diagram showing one embodiment of an image reading apparatus made in accordance with the invention.

Referring to FIG. 6, there is shown a schematic block diagram of an image reading apparatus embodying the invention. The image reading apparatus, generally designated by the numeral 20, includes a dither conversion unit COMP1, a binary conversion unit COMP2, a background processing unit COMP3, and a display signal output unit COMP4. The read image signal S1, produced from the photoelectric conversion element 7, has a level corresponding to the brightness density of each of the scanned pixels. The dither conversion unit COMP1, coupled to the read image signal S1, employs a dither matrix for converting the read image signal S1 into a dither converted signal S11 substantially in the same manner as described in connection with FIG. 1. The dither converted signal S11 is fed to the display signal output unit COMP4.

The binary conversion unit COMP2, coupled to the read image signal S1, converts the read image signal S1 into a binary converted signal S12. The binary converted signal S12 has a high level representing a white pixel when the read image signal S1 has a level equal to or greater than a threshold level set in the binary conversion unit COMP2 and a low level representing a black pixel when the read image signal S1 has a level smaller than the threshold level. The binary signal S12 is fed to the display signal output unit COMP4. The binary conversion unit COMP2 includes a descrimination circuit for making a determination, from the binary converted signal S12, as to whether the image scanner 1 is scanning a halftone area or a white/black text area. The descrimination circuit causes the display signal output unit COMP4 to pass the dither converted signal S11 to the automatic feed unit 11 when the discrimination circuit detects the fact that the image scanner 1 is scanning the halftone area. The display signal output unit COMP4 mixes the binary converted signal S12 with the dither converted signal S11 and the resulting signal is fed to the automatic feed unit 11 when the discrimination circuit detects the fact that the image scanner 1 is scanning the white/black text area.

In this embodiment, the background processing unit COMP3 produces a high-level white background detection signal S13 when the read image signal S1 has a level equal to or greater than the brightness density of the white background. The white background detection signal S13 is fed to the dither conversion unit COMP1 for the purpose of providing sharper white-background reproduction characteristics. The background processing unit COMP3 uses the white background detection signal S13 to detect the fact that the image scanner 1 is scanning the white background. The background processing unit COMP3 produces a background detection signal S14 to the binary conversion unit COMP2 which thereby causes the display signal output unit COMP4 to produce the binary converted signal S12 when the image scanner 1 is scanning the white background.

The background processing unit COMP3 also produces a low-level black background detection signal S15 when the read image signal S1 has a level equal to or smaller than the brightness density of the black background. The black background detection signal S13 is fed to the dither convertion unit COMP1 for the purpose of providing sharper black-background reproduction characteristics.

Figure 7:
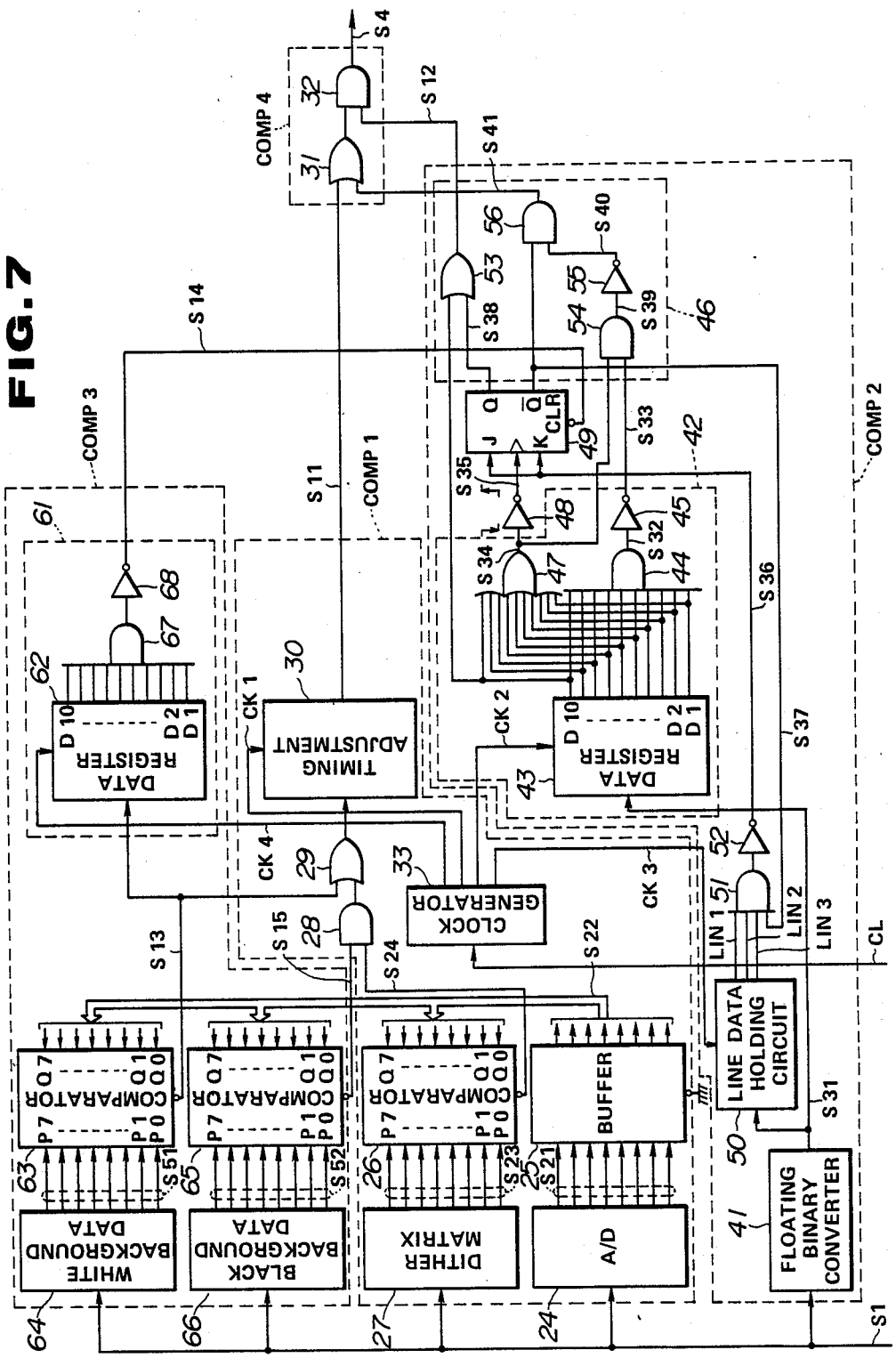
FIG. 7 is a circuit diagram showing the detailed arrangement of the image reading apparatus of FIG. 6.

Referring to FIG. 7, the dither conversion unit COMP1 includes an analog-to-digital converter (A/D) 24 for converting the read image signal S1 into 8-bit read pixel data S21 which represent the brightness density of the read pixel. The read pixel data S21 are stored in a buffer 25. The reference character S22 designates read pixel data read from the buffer 25. The read pixel data S22 are transferred to a comparator circuit 26 through its input terminals Q0 to Q7. The comparator circuit 26 has input terminals P0 to P7 supplied with the 8-bit dither matrix data S23 produced from a dither matrix data generator 27. The dither matrix data S23 represent the brightness density threshold value. The comparator circuit 26 compares the read pixel data S22 with the dither matrix data S23 and produces a dither converted signal S24. The dither converted signal S24 has a low level representing a black pixel when the read pixel data S22 are smaller than the dither matrix data S23 and a high level representing a white pixel when the read pixel data S22 are equal to or greater than the dither matrix data S23.

The dither converted signal S24 is applied to one input of an AND circuit 28 having another input from a background black comparator circuit 65 to be described later. The AND circuit 28 has an output connected to one input of an OR circuit 29 having another input coupled to a background white comparator circuit 63 to be described later. The OR circuit 29 has an output connected to a timing adjustment circuit 30. The timing adjustment circuit 30, which may comprise a delay circuit, provides a predetermined time delay to the signal outputted from the OR circuit 29 and produces a dither converted display signal S11 to the display signal output unit COMP4. The time delay corresponds to the time during which the binary conversion unit COMP2 processes a predetermined number of (in this case 10) pixels to cause the time at which the dither converted display signal S11 arrives at the display signal output unit COMP4 to coincide with the time at which the binary converted display signal S12 is applied from the binary conversion unit COMP2 to the display signal output unit COMP4. For this purpose, the timing adjustment circuit 30 operates on clock pulses CK1 fed thereto from a clock pulse generator 33.

Figure 8:
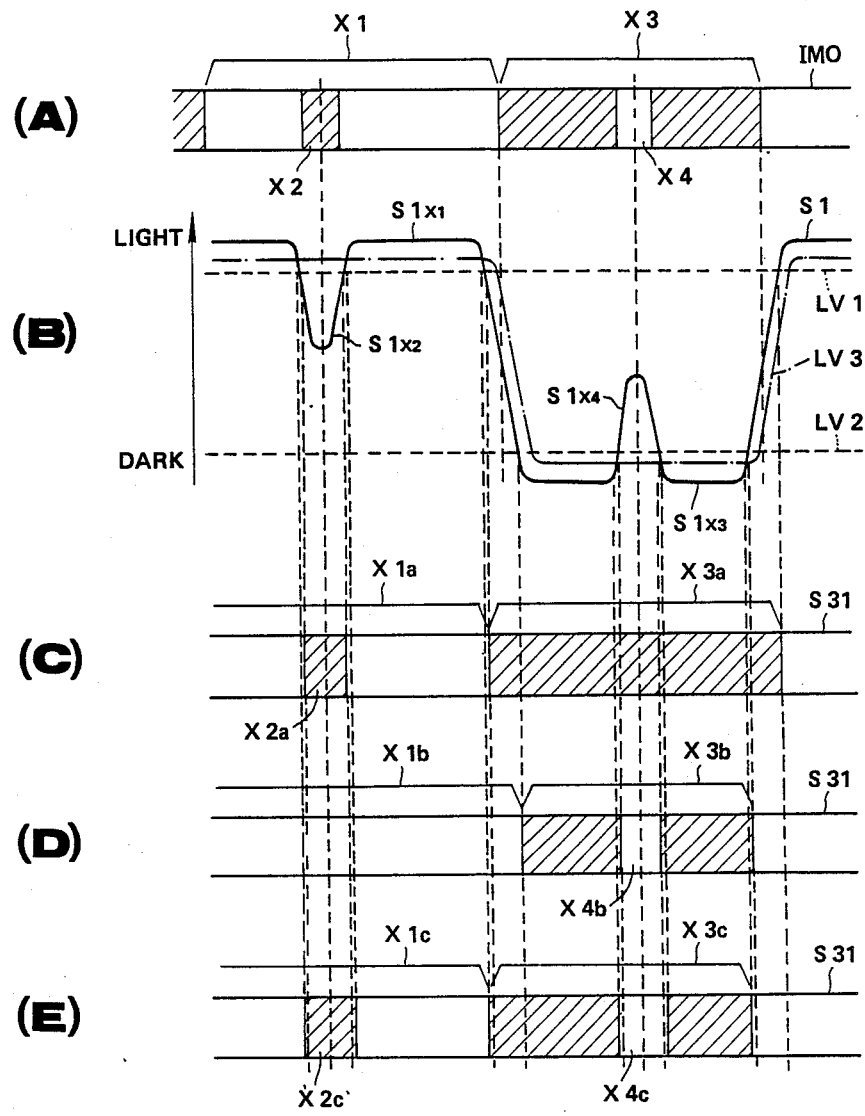
FIG. 8 contains five diagrams used in explaining the operation of the floating binary converter of the image reading apparatus.

The binary conversion unit COMP2 includes a floating binary converter 41 having a floating threshold value for converting the read image signal S1 into a binary converted signal S31. The binary converted signal S31 has a high level representing a white pixel when the read image signal S1 is equal to or greater than the floating threshold value and a low level representing a black pixel when the read image signal S1 is less than the floating threshold value. The floating threshold value varies according to the level of the read image signal S1. This will be described in greater detail with reference to FIG. 8.

When the photoelectric conversion element 7 reads a document IMO containing a black line X2 dividing a wide white area X1 and a white line X4 dividing a wide black area X3, as shown in FIG. 8A, it produces a read image signal S1 as shown by the bold curve of FIG. 8B. The read image signal S1 has signal portions $S1_{X1}$ produced for the white area X1, a signal portion $S1_{X2}$ produced for the black line X2, signal portions $S1_{X3}$ produced for the black area X3, and a signal portion $S1_{X4}$ produced for the white line X4. It can be seen from FIG. 8B that the signal portion $S1_{X2}$ cannot decrease to the level of the signal portions $S1_{X3}$ produced for the black area X3 and the signal portion $S1_{X4}$ cannot increase to the level of the signal portions $S1_{X1}$ produced for the white area X1. If the binary converter 41 is arranged to have a fixed threshold value LV1 (FIG. 8B) crossing the signal portion $S1_{X2}$, the white line X4 cannot be reproduced although the black line X1 can be reproduced, as shown in FIG. 8C. If the binary converter 41 is arranged to have a fixed threshold value LV2 (FIG. 8B) which crosses the signal portion $S1_{X4}$, the black line X1 cannot be reproduced although the white line X4 in the wide black portion X3 can be reproduced, as shown in FIG. 8D. The invention can eliminate these problems by arranging the binary converter 41 to have a floating threshold value LV3 which changes between its high and low levels according to the level of the read image signal S1 as shown in FIG. 8B. The floating threshold value LV3 has a high level crossing the signal portion $S1_{X2}$ when a wide white area is being processed and changes to a low level crossing the signal portion $S1_{X4}$ when a wide black area is being processed. Such a floating threshold value may be obtained, for example, by adding the brightness densities of a predetermined number of pixels positioned before and after the present pixel with appropriate weights. With the use of such a floating threshold value, it is possible to reproduce both of the black line X2 dividing the wide white area X1 and the white line X4 dividing the wide black area X3.

The binary conversion unit COMP2 also includes a successive pixel descrimination circuit 42 which includes a successive pixel data register 43 having an input coupled to the floating binary converter 41. The successive pixel data register 42 operates on clock pulses CK2 fed thereto from the clock pulse generator 33 to store binary pixel data of 10 successive pixels and produce 10-bit data D1–D10 to the 10-inputs of an AND circuit 44 and also to a 10-input OR circuit 47. The 10-input AND circuit 44 produces an output signal S32 which has a high level representing the fact that all of the successive 10 pixels are white pixels only when all of the data D1-D10 are high. The output signal S32 is applied to an inverter 45. The inverter 45 inverts the output signal S32 to produce an inverted output S33 which is applied to an output circuit 46. The 10-input OR circuit 47 produces an output signal S34 which has a low level representing the fact that all of the successive 10 pixels are black pixels only when all of the 10-bit data are low. The output signal S34 is applied directly to the output circuit 46 and also to an inverter 48 which inverts the signal S34 and produces an inverted signal S35.

Figure 9:
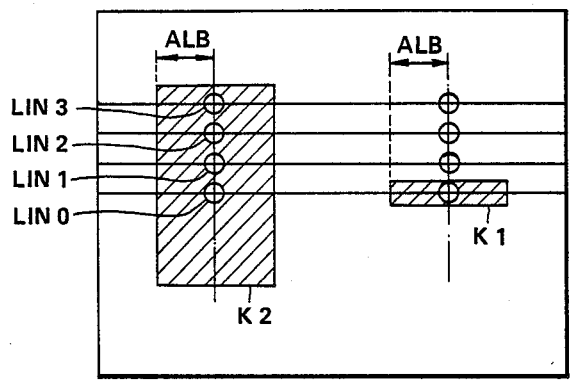
FIG. 9 is a diagram used in explaining the operation of the line data holding circuit of the image reading apparatus.

The binary converted signal S31 is also fed from the floating binary converter 41 to a line data holding circuit 50 which operates on clock pulses CK3 fed thereto from the clock pulse generator 33 for retaining data corresponding to three line segments of pixels. Assuming now that the line data holding circuit 50 receives a binary pixel data LIN0 (FIG. 9) from the floating binary converter 41, it produces binary pixel data LIN1 (FIG. 9) one line before the received binary pixel data LIN0, binary pixel data LIN2 (FIG. 9) two lines before the received pixel LIN0, and binary pixel data LIN3 (FIG. 9) three lines before the received binary pixel data LIN0. These binary pixel data signals LIN1, LIN2 and LIN3 are fed to three inputs of a 4-input AND circuit 51 having another input coupled to a lock signal S37 fed thereto from the Q output terminal of a J-K flip-flop circuit 49 which constitutes a half-tone text portion detecting circuit. The 4-input AND circuit 51 produces an output signal applied to an inverter 52 which inverts it to produce a signal S37. The signal S37 is applied to the J and K input terminals of the J-K flip-flop circuit 49. The signal S36 has a high level when at least one of the four signals applied to the four inputs of the 4-input AND circuit 51 is low.

It is assumed now that the J-K flip-flop circuit 49 is in its cleared state producing a low output at its Q output terminal and a high output at its $\bar{Q}$ output terminal. When at least one of the three line data signals LIN1, LIN2 and LIN3 has a low level representing a black pixel, the signal S36 changes to its high level. When, under this condition, the signal S35 changes from its low level to its high level representing the fact that all of the successive 10 pixels are white pixels, the J-K flip-flop circuit 49 is set to produce a high level signal at its Q output terminal and a low level signal at its $\bar{Q}$ output terminal. The low level signal S37 is applied from the J-K flip-flop circuit 49 to the 4-input AND circuit 51 to hold the signal S36 at its high level. As a result, the J-K flip-flop 49 is retained in its set condition until it is cleared by a background detection signal S14 fed to its clear terminal CLR from the background processing unit COMP3. This is effective to prevent the J-K flip-flop circuit 49 from being set when the image scanner 1 scans 10 successive pixels black pixels, as indicated by the character K1 of FIG. 9. The J-K flip-flop circuit 49 can be set when the scanned image contains four lines of 10 successive pixels black pixels, as shown by the character K2 of FIG. 9. The J-K flip-flop circuit 49 produce a halftone area detection signal S38 which changes to its high level when it is set.

The output unit 46 includes an OR circuit 53 having an input connected to the Q output terminal of the J-K flip-flop circuit 49 and another input connected to the 10th-bit output terminal of the successive pixel data register 43. The OR circuit 53 produces a binary converted display signal S12 to the display signal output unit COMP4. The binary converted display signal S12 has the same logical level as the binary data D10 fed from the 10th-bit output terminal of the successive pixel data register 43 when the J-K flip-flop circuit 49 is cleared. The binary converted display signal S12 has a high level regardless of the binary data D10 when the J-K flip-flop circuit 49 is set.

The output unit 46 also includes an AND circuit 54 having an input coupled to the successive white pixel detection signal S33 from the inverter 45 and another input coupled to the successive black pixel detection signal S34 from the OR circuit 47. The AND circuit 54 produces an output signal S39 coupled to an inverter 55 which inverts it to produce a white/black text area detection signal S40 to one input of an AND circuit 56 having another input connected to the $\bar{Q}$ output terminal of the J-K flip-flop circuit 49. The AND circuit 56 produces a control signal S41 coupled to the display signal output unit COMP4. The signal S39 has a high level when the 10 successive pixels contains white and black pixels: that is, when the successive white pixel detection signal S33 has a high level representing the fact that the 10 successive pixels include at least one black pixel and when the successive black pixel detection signal S34 has a high level representing the fact that the successive 10 pixels include at least one white pixel. Under this condition, the white/black text area detecting signal S40 has a low level representing the fact that the image scanner 1 is scanning a white/black text area, retaining the control signal S41 at its low level. The control signal S41 is at its high level when the image scanner 1 is scanning a background; that is, when the image scanned by the image scanner 1 contains neither a white/black text area nor a halftone area.

The background processing unit COMP3 includes a background detecting circuit 61 which includes a successive pixel data register 62. The successive pixel data register 62, which may be a 10-bit shift register, operates on clock pulses CK4 fed thereto from the clock pulse generator 33 for storing binary pixel data of successive 10 pixels fed thereto from the white background comparator circuit 63 and produces 10-bit data D1-D10 to the 10-inputs of an AND circuit 67. The 10-input AND circuit 67 has an output coupled through an inverter 68 to the clear terminal CLR of the J-K flip-flop circuit 49. The white background comparator circuit 63 has input terminals Q0 to Q7 through which the read pixel data S22 are transferred to the white background comparator circuit 63 and input terminals P0 to P7 through which 8-bit white background data S51 are transferred thereto from a white background data holding circuit 64. The white background data S51 represents the brightness density of the white background obtained during a preparatory scanning operation made prior to the scanning operation to read the image IMO1 from the document. The white background comparator circuit 63 compares the read pixel data S22 with the white background data S51 and produces a white background detection signal S13. The white background detection signal S13 has a high level representing that the read pixel has a brightness density equal to or greater than the white background only when the read pixel data S22 are equal to or greater than the white background data S51. The white background detection signal S13 is applied to the successive pixel data register 62 and also to the another input of the OR circuit 29.

The background processing unit COMP3 also includes a black background comparator circuit 65. The black background comparator circuit 65 has input terminals Q0 to Q7 through which the read pixel data S22 are transferred to the black background comparator circuit 65 and input terminals P0 to P7 through which 8-bit black background data S52 are transferred thereto from a black background data holding circuit 66. The black background data S52 represent the brightness density of the black background obtained during the preparatory scanning operation made prior to the scanning operation to read the image IMO1 from the document. The black background comparator circuit 65 compares the read pixel data S22 with the black background data S52 and produces a black background detection signal S15. The black background detection signal S15 has a low level representing that the read pixel has a brightness density equal to or smaller than the black background only when the read pixel data S22 are equal to or smaller than the black background data S52. The black background detection signal S15 is applied to the another input of the AND circuit 28.

Figure 10:
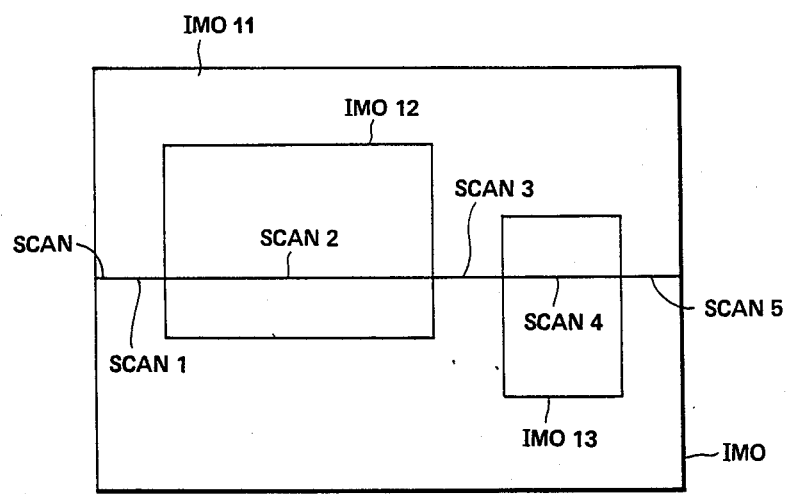
FIG. 10 is a diagram showing an example of the image to be read.

The operation of the image reading apparatus will be described. It is now assumed that a document IMO containing a halftone area IMO12 and white/black text area IMO13 disposed on a background area IMO11 is scanned along a scan line SCAN, as shown in FIG. 10. The display signal S4 produced from the display signal output unit COMP4 is the dither converted display signal S11 when the halftone area IMO12 is scanned, is the dither converted display signal S11 mixed with the binary converted display signal S12 when the white/black text area 1M013 is scanned, and is the binary converted display signal S12 when the background area IMO11 is scanned.

The read image signal S1 is fed from the image scanner 1 to the analog-to-digital converter 24 and also to the floating binary converter 41. The analog-to-digital converter 24 converts the read image signal S1 into digital form having 8-bit brightness density data S23 for each pixel. The converted digital data S21 are transferred to and read from the buffer 25 to form a read pixel data signal S22. The floating binary converter 41 compares the read image signal S1 with a floating threshold level to make a determination whether the scanned pixel is a white or black pixel and produces a binary converted signal S31 having binary pixel data which represent the result of the determination. The binary converted signal S31 is fed to the successive pixel data register 43 which latches the new pixel data D10 along with old pixel data D9 to D1 for the successive 9 pixels scanned prior to the new pixel. The binary converted signal S31 is also applied to the line data holding circuit 50 which latches the new pixel data and produces old pixel data LIN1, LIN2 and LIN3 for the old pixels one line, two lines and three lines before the new pixel. The old pixel data signals LIN1, LIN2 and LIN3 are fed to the 4-input AND circuit 51.

When the image scanner 1 is scanning the background area IMO11 along the scan line portion SCAN1 under a normal condition where the read pixel data signal S22 is greater than the black background data S52 read from the black background data holding circuit 66 and is smaller than the white background data S51 read from the white background data holding circuit 64, the white background detection signal S13 has a low level and the black background detection signal S15 has a high level. The dither comparator circuit 26 compares the read pixel data signal S22 with the dither matrix data 27 read from the dither matrix data holding circuit 27 to produce a dither converted signal S24. The dither converted signal S24 has a high level when the read pixel data signal S22 is equal to or greater than the dither matrix data S23 and a low level when the read pixel data S22 are smaller than the dither matrix data S23. Under this condition, the dither converted signal S24 passes the AND circuit 28 and the OR circuit 29 to the timing adjustment circuit 30 which thereby produces a dither converted display signal S11 delayed in time relative to the dither converted signal S24, as described previously.

The successive pixel descrimination circuit 42 detects the fact that the image scanner 1 is scanning the background area IMO11 when all of the pixel data D1 to D10 have a high level representing a white pixel. The OR circuit 47 produces a high-level signal S34. The high-level signal S34 is applied to the inverter 48 which inverts it to a low-level signal S34. The low-level signal S35 has no effect on the J-K flip-flop circuit 49. Accordingly, the J-K flip-flop circuit 49 is held in its clear state producing, a low-level signal S38 at its Q output terminal and a high-level signal S37 at its $\overline{Q}$ output terminal. The low-level signal S38 is applied to permit the high-level pixel data signal D10 to pass the OR circuit 53 so as to form a high-level binary signal S12 which is applied to the AND circuit 32.

The AND circuit 44 produces a high-level signal S32. The high-level signal S32 is applied to the inverter 45 which inverts it to a low-level signal S33. The low-level signal S33 is applied to cause the AND circuit 54 to produce a low-level signal S39. The low-level signal S39 is applied to the inverter 55 which inverts it to a high-level signal S40 which is applied to the AND circuit 56. Since the signal S37 applied from the $\overline{Q}$ output terminal of the J-K flip-flop circuit 49 has a high-level, the AND circuit 56 produces a high-level control signal S41, causing the OR circuit 31 to block the dither converted signal S11 and the AND circuit 32 to pass the binary converted display signal S12 so as to form the display signal S4.

Figure 11:
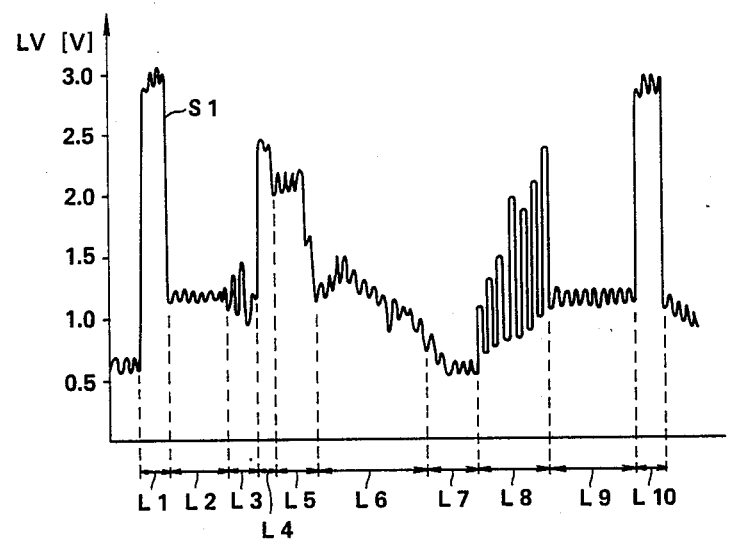
FIG. 11 is a graph showing changes in the read image signal when the halftone area is scanned.

When the image scanner 1 is scanning the halftone area IMO12 along the scan line portion SCAN2, a great change appears unusually in the read image signal S1 produced from the photoelectric conversion element 7. For example, FIG. 11 shows changes in the read image signal S1 produced when a halftone picture of a woman's face deposited on a white background is scanned by the image scanner 1 moving along a scan line crossing her nose. The image scanner 1 scans the halftone picture in the following order: its dark background image portion L2, its left hair image portion L3, its nose image portion L4, its left face image portion L5, its right face image portion L6, its right hair image portion L7, and its shining hair image portion L8 and its dark background image portion L9. The read image signal S1 has a very high level only when the white background area L1 or L10 is scanned. Under this condition, the binary signal S31 produced from the floating binary converter 41 is a high-level signal when the white background area L1 is scanned, a low-level signal when the dark background image portion L2 or the left hair image portion L3 is scanned, a high-level signal when the nose image portion L4 or the left face image portion L5 is scanned, a low-level signal when the right face image portion L6 or the right hair image portions L7 is scanned, a signal changing repetitively between high and low levels when the shining right hair image portion L8 is scanned, a high-level signal when the dark background image portion L9 is scanned, and a high-level signal when the white background area L10 is scanned, as shown in FIG. 12.

Figure 12:
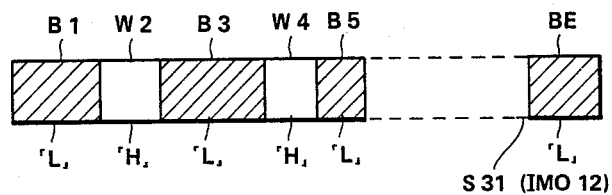
FIG. 12 is a diagram showing changes in the binary signal when the halftone area is scanned.

It is to be noted that, when a halftone area is scanned, the binary converted signal S31 changes alternatively between its high and low levels normally at intervals of time longer than the time required for the image scanner 1 to scan 10 or more pixels, as shown in FIG. 12, where the characters B1, B3, B5, . . . BE designate the intervals during which the binary signal S31 has a low level and the characters W2 and W4 designate the intervals during which the binary signal S31 has a high level. Accordingly, it may be said that the image scanner 1 is scanning a halftone area when the binary converted signal S31 remains at its low level for a time period longer than a time required for the image scanner 1 to scan 10 successive pixels or more pixels.

When the image scanner 1 starts scanning the halftone area IMO12 along the scan line portion SCAN2, the white background comparator circuit 63 produces a low-level white background detection signal S13 and the black background comparator circuit 65 produces a high-level white background detection signal S15. The dither comparator circuit 26 compares the read pixel data signal S22 with the dither matrix data S23 read from the dither matrix signal generator 27 and produces a dither converted signal S24. Under this condition, the dither converted signal S24 passes the AND circuit 28 and the OR circuit 29 to the timing adjustment circuit 30 which thereby produces a dither converted display signal S11 delayed in time relative to the dither converted signal S24, as described previously.

At a time when the successive pixel data register 43 accumulates 10 successive pixels black pixel data; that is, all of the pixel data D1 to D10 have a low level representing a black pixel, the successive pixel descrimination circuit 42 detects the fact that the image scanner 1 is scanning the halftone area IMO12. The signal S34 produced from the OR circuit 47 changes from its high level to its low level. The low-level signal S34 is applied to the inverter 48 which inverts it to a high-level signal S35 which sets the J-K flip-flop circuit 49 since at least the present line data signal LINO has a low level. Accordingly, the J-K flip-flop circuit 49 produces a high-level signal S38 at its Q output terminal and a low-level signal S37 at its $\overline{Q}$ output terminal. The high-level signal S38 is applied, causing the OR circuit 53 to block the low-level pixel data signal D10. The high-level signal S12 is applied from the OR circuit 53 to the AND circuit 32. The low-level signal S37 is applied from the $\overline{Q}$ output terminal of the J-K flip-flop circuit 49, causing the AND circuit 56 to produce a low-level control signal S41. The low-level control signal S41 is applied to permit the dither converted display signal S11 to pass the OR circuit 31. Since the AND circuit 32 has a high-level input from the OR circuit 53, it permits the dither converted display signal S11 to pass the AND circuit 32 so as to form the display signal S4.

When the image scanner 1 starts scanning the light portion W2 (FIG. 12) following the dark portion B1 (FIG. 12), the white background comparator circuit 63 produces a low-level white background detection signal S13 and the black background comparator circuit 65 produces a high-level white background detection signal S15. The dither comparator circuit 26 compares the read pixel data signal S22 with the dither matrix data S23 read from the dither matrix signal generator 27 and produces a dither converted signal S24. Under this condition, the dither converted signal S24 passes the AND circuit 28 and the OR circuit 29 to the timing adjustment circuit 30. The timing adjustment circuit 30 produces a dither converted display signal S11 to the OR circuit 31. The dither converted display signal S11 is the same as the dither converted signal S24 except that it is delayed in time relative to the dither converted signal S24.

At a time when the successive pixel data register 43 accumulates successive 10 white pixel data; that is, all of the pixel data D1 to D10 have a high level representing a white pixel, the signal S34 produced from the OR circuit 47 changes from its low level to its high level. The high-level signal S34 is applied to the inverter 48 which inverts it to a low-level signal S35. The low-level signal S35 has no effect on the J-K flip-flop circuit 49. Accordingly, the J-K flip-flop circuit 49 remains in its set state producing a high-level signal S38 at its Q output terminal and a low-level signal S37 at its $\overline{Q}$ output terminal. Under this condition, the binary data signal D10 is blocked by the OR circuit 53 and the dither converted display signal S11 passes the OR circuit 31 and the AND circuit 32 so as to form the display signal S4.

When the image scanner 1 starts scanning the dark portion B3 (FIG. 12) following the light portion W2 (FIG. 12), black pixel data are written into the successive pixel data register 43. At a time when the successive pixel data register 43 accumulates successive 10 black pixel data; that is, all of the pixel data D1 to D10 have a low level representing a black pixel, the signal S34 produced from the OR circuit 47 changes from its high level to its low level. The low-level signal S34 is applied to the inverter 48 which inverts it to a high-level signal S35. The high-level signal S35 is applied to trigger the J-K flip-flop circuit 49. Since the lock signal is a low-level signal, causing the AND circuit 51 to produce a low-level signal so that the J-K flip-flop circuit 49 has high-level inputs at its J and K input terminals, the J-K flip-flop circuit 49 remains in its set state. Under this condition, the binary data signal D10 is blocked by the OR circuit 53 and the dither converted display signal S11 passes the OR circuit 31 and th AND circuit 32 so as to form the display signal S4.

It is apparent that the display signal S4 outputted from the display signal output unit COMP4 is the same as the dither converted display signal S11 when the image scanner 1 is scanning the halftone area IM012.

When the image scanner 1 starts scanning the background area IM011 along the scan line portion SCAN3, the white background comparator circuit 63 produces a high-level white background detection signal S13 since the read pixel data S22 have a brightness density equal to the white background data S51 read from the white background data holding circuit 64. The high-level white background detection signal S13 is applied to the successive pixel data register 62. At a time when all of the data accumulated in the successive pixel data register 62 have a high level, the AND circuit 67 produces a high-level signal. This high-level signal is applied to the inverter 68 which inverts it to a low-level background detection signal S14. The low-level signal S14 is applied to the clear terminal OLR of the J-K flip-flop circuit 49, causing the J-K flip-flop circuit 49 to change from its set state into its cleared state producing a low-level signal S38 at its Q output terminal and a high-level signal S37 at its Q̄ output terminal. The low-level signal S38 is applied to the OR circuit 53 which thereby passes the pixel data signal D10 which forms a high-level binary converted display signal S12. The high-level binary converted display signal S12 is applied to the AND circuit 32. The high-level signal S37 is applied to the AND circuit 56.

Under this condition, the successive pixel data register 43 has accumulated 10 successive pixel white pixel data; that is, all of the pixel data D1 to D10 have a high level representing a white pixel. Accordingly, the AND circuit 44 produces a high-level signal S32. The high-level signal S32 is applied to the inverter 45 which inverts it to a low-level signal S33. The low-level signal S33 is applied to cause the AND circuit 54 to produce a low-level signal S39. The low-level signal S39 is applied to the inverter 55 which inverts it to a high-level signal 40. The high-level signal S40 is applied, along with the high-level signal S37, to the AND circuit 56 which thereby produces a high-level control signal S41. The high-level control signal S41 is applied to the OR circuit 31 which thereby blocks the dither converted display signal S11 and produces a high-level signal, causing the AND circuit 32 to pass the binary converted display signal S12 so as to form the display signal S4.

Figure 13:
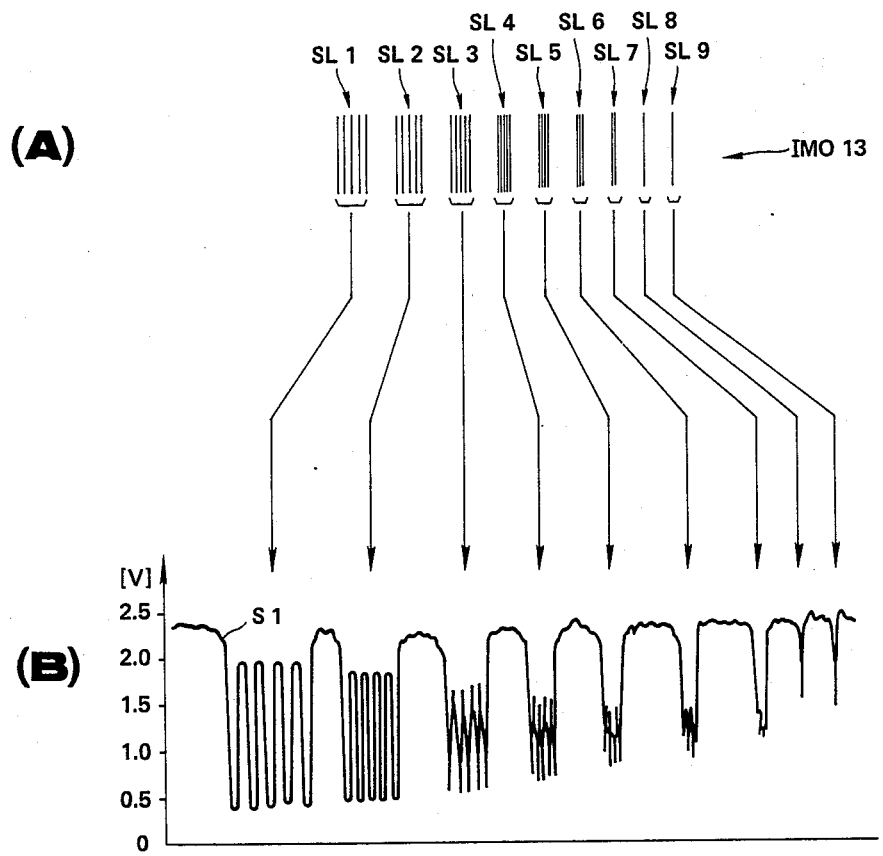
FIG. 13 is a graph showing changes in the read image signal when the white/black text area is scanned.
Figure 14:
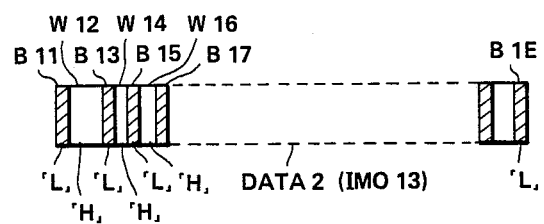
FIG. 14 is a diagram showing changes in the binary signal when the white/black text area is scanned.

When the image scanner 1 is scanning the white/black text area IM013 along the scan line portion SCAN4, great changes appear in the read image signal S1 produced from the photoelectric conversion element 7. For example, FIG. 13B shows changes in the read image signal S1 produced when the image scanner 1 scans a white/black text area having different line elements SL1 to SL9 as shown in FIG. 13A. Accordingly, the binary converted signal S31 produced from the floating binary conveter 41 changes alternatively between high and low levels at intervals of time shorter than the time required for the image scanner 1 to scan 10 or more pixels, as shown in FIG. 14, where the characters B11, B13, B15, B17, . . . D1E designate the intervals during which the binary converted signal S31 has a low level and the characters W12, W14 and W16 designate the intervals during which the binary converted signal S31 has a high level. It may be said that the image scanner 1 is scanning a white/black text area when the binary converted signal S31 changes alternatively between high and low levels at intervals of time shorter than the time required for the image scanner 1 to scan 10 or more pixels; that is, when the successive pixel data register 43 accumulates white and black pixel data.

When the image scanner 1 is scanning the white/black text area IM013 along the scan line portion SCAN4, the OR circuit 47 produces a high-level signal S34. The high-level signal S34 is applied to the AND circuit 54 and also to the inverter 48 which inverts it to a low-level signal S35. The low-level signal S35 has no effect on the J-K flip-flop circuit 49. Accordingly, the J-K flip-flop circuit 49 remains in its cleared state producing a low-level signal S38 at its Q output terminal and a high-level signal S37 at its Q̄ output terminal. The low-level signal S38 is applied to the OR circuit 53 which thereby passes the new pixel data D10 to form the binary converted display signal S12. The binary converted display signal S12 is applied to the AND circuit 32.

Under this condition, the AND circuit 44 produces a low-level signal S32. The low-level signal S32 is applied to the inverter 45 which inverts it to a high-level signal S33. The high-level signal S33 is applied, along with the high-level signal S34, to cause the AND circuit 54 to produce a high-level signal S39. The high-level signal S39 is applied to the inverter 55 which inverts it to a low-level signal S40. The low-level signal S40 is applied to cause the AND circuit 56 to produce a low-level control signal S41. The low-level control signal S41 is applied to the OR circuit 31 which thereby passes the dither converted display signal S11 to the AND circuit 32. Accordingly, the output unit COMP4 mixes the dither-converted and binary-converted display signals S11 and S12 to form the display signal S4.

In this embodiment, the white background comparator circuit 63 produces a white background detection signal S13 as a result of comparison of the pixel data S22 with the white background data S51 read from the white background data holding circuit 64. The white background detection signal S13 is applied to the OR circuit 29. Accordingly, the dither converted signal S24, which is produced from the dither comparator circuit 26 as a result of comparison of the pixel data signal S22 with the dither matrix data signal S23 read from the dither matrix data holding circuit 27, is replaced by a high-level white background detection signal S13 when the pixel data S22 are equal to or greater than the white background data S51. This is effective to provide sharper white-background reproduction characteristics.

In addition, the black background comparator circuit 65 produces a black background detection signal S15 as a result of comparison of the pixel data S22 with the black background data S52 read from the black background data holding circuit 66. The black background detection signal S15 is applied to the AND circuit 28. Accordingly, the dither converted signal S24 is replaced by a low-level black background detection signal S15 when the pixel data S22 is smaller than the black background data S52. This is effective to provide sharper black-background reproduction characteristics.

When the image scanner 1 starts scanning the background area IM011 along the scan line portion SCAN5, the successive pixel data register 43 stores successive white pixel data while the J-K flip-flop circuit 49 remains in its cleared state. At a time when all of the pixel data accumulated in the successive pixel data register 43 have a high-level representing a white pixel, the signal S34 produced from the OR circuit 47 remains at its high level and the signal S32 produced from the AND circuit 44 changes to its high level. Under this condition, the J-K flop-flop circuit 49 remains in its cleared state producing a low-level signal S38 to the OR circuit 53 which thereby passes the pixel data D10 to form a binary signal S12. The binary signal S12 is applied to the AND circuit 32. The high-level signal S32 is applied to the inverter 45 which inverts it to a low-level signal S33, causing the AND circuit 54 to produce a low-level signal S39. The low-level signal S39 is applied to the inverter 55 which inverts it to a high-level signal S40. The high-level signal S40 is applied, along with the high-level signal from the Q̄ output terminal of the J-K flip-flop circuit 49, to the AND circuit 56. Accordingly, the AND circuit 56 produces a high-level control signal S41. The high-level control signal S41 is applied to the OR circuit 31 which thereby blocks the dither converted display signal S11 and produces a high-level signal, causing the AND circuit 32 to pass the binary converted display signal 12 so as to form the display signal S4.

It is, therefore, apparent from the foregoing that the invention provides an image processing apparatus which can provide good halftone reproduction characteristics by producing the dither converted display signal S11 to form the display signal S4 when the image scanner 1 scans the halftone area IM012 on the document. In addition, the image processing apparatus mixes the dither converted display signal S11 with the binary converted display signal S12 to form the display signal S4 when the image scanner 1 scans the white/black text area IM013. The dither converted display signal S11 provides good halftone reproduction characteristics and the binary converted display signal S12 provides good resolution in line copy reproduction (e.g., text matter, drawings, etc.).

While this invention has been described in conjunction with a specific embodiment thereof, it is evident that many alternatives, modifications and variations will apparent to those skilled in the art. Accordingly, it is intended to embrace all alternatives, modifications and variations that fall within the scope of the appended claims.

What is claimed is:

1. An image reading apparatus for converting an image on a document having a white/black text area into a display signal, comprising:
    an image reader for scanning pixels forming the image to produce a read signal having a level corresponding to the brightness density of each of the scanned pixels;
    means for generating a dither matrix data signal;
    means for comparing the read signal with the dither matrix data signal to produce a dither converted signal;
    a binary converter for comparing the read signal with a threshold level to produce a binary signal having a first level representing a white pixel and a second level representing a black pixel;
    a discrimination circuit responsive to the binary signal for producing a detection signal when the black/white text area is scanned; and
    means responsive to the detection signal for mixing the dither converted signal and the binary signal to form the display signal.

2. The image reading apparatus as claimed in claim 1, wherein the binary converter includes means for varying the threshold level in accordance with the level of the read signal.

3. The image reading apparatus as claimed in claim 1, which includes means for producing a white background level, means for comparing the read signal with the white background level to produce a white background detection signal when the read signal is equal to or greater than the white background level, and means for replacing the dither converted signal with the white background detection signal.

4. The image reading apparatus as claimed in claim 3, which includes means for generating a black background level, means for comparing the read signal with the black background level to produce a black background detection signal when the read signal is smaller that the black background detection signal, and means for replacing the dither converted signal with the black background detection signal.

5. An image reading apparatus for converting an image on a document having a white/black text area into a display signal, comprising:
    an image reader for scanning pixels forming the image to produce a read signal having a level corresponding to the brightness density of each of the scanned pixels;
    means for generating a dither matrix data signal;
    means for comparing the read signal with the dither matrix data signal to produce a dither converted signal;
    a binary converter for comparing the read signal with a threshold level to produce a binary signal having a first level representing a white pixel and a second level representing a black pixel;
    a discrimination circuit responsive to the binary signal for producing a detection signal when the white/black text area is scanned, including means for producing the detection signal when the binary signal changes alternatively between the first and second levels at intervals of time shorter than the time required for the image reader to scan a predetermined number of successive pixels; and
    means responsive to the detection signal for mixing the dither converted signal and the binary signal to form the display signal.

6. The image reading apparatus as claimed in claim 5, wherein the discrimination circuit includes means for storing the binary signal at predetermined time intervals to accumulate binary pixel data for the predetermined number of successive pixels, and means for producing the detection signal when the accumulated binary pixel data have first and second levels.

7. An image reading apparatus for converting an image on a document having background and halftone areas into a display signal, comprising:
    an image reader for scanning pixels forming the image to produce a read signal having a level corresponding to the brightness density of each of the scanned pixels;
    means for generating a dither matrix data signal;
    means for comparing the read signal with the dither matrix data signal to produce a dither converted signal;
    a binary converter for comparing the read signal with a threshold level to produce a binary converted signal having a first level representing a white pixel and a second level representing a black pixel;
    a discrimination circuit responsive to the binary converted signal for producing a first detection signal when the halftone area is scanned and a second detection signal when the background area is scanned;
    means responsive to the first detection signal for producing the dither converted signal to form the display signal, the means being responsive to the second detection signal for producing the binary converted signal to form the display signal.

8. The image reading apparatus as claimed in claim 7, wherein the binary converter includes means for varying the threshold level in accordance with the level of the read signal.

9. The image reading apparatus as claimed in claim 7, wherein the discrimination circuit includes means for producing the first detection signal when the binary converted signal changes alternatively between its first and second levels at intervals of time longer than the time required for the image reader to scan a predetermined number of successive pixels.

10. The image reading apparatus as claimed in claim 9, wherein the discrimination circuit includes means for storing the binary converted signal at predetermined time intervals to accumulate binary pixel data for the predetermined number of successive pixels, and means for producing the first detection signal when all of the accumulated binary pixel data represent white or black pixels.

11. The image reading apparatus as claimed in claim 9, wherein the discrimination circuit includes a background detection circuit for producing a background detection signal when the read signal remains at a background level for a time longer than the time required for the image reader to scan the predetermined number of successive pixels, and means responsive to the background detection signal for producing the second detection signal.

12. An image reading apparatus for converting an image on a document having background, white/black text and halftone areas into a display signal, comprising:
   an image reader for scanning pixels forming the image to produce a read signal having a level corresponding to the brightness density of each of the scanned pixels;
   means for generating a dither matrix data signal;
   means for comparing the read signal with the dither matrix data signal to produce a dither converted signal;
   a binary converter for comparing the read signal with a threshold level to produce a binary signal having a first level representing a white pixel and a second level representing a black pixel;
   a discrimination circuit responsive to the binary converted signal for producing a first detection signal when the halftone area is scanned, a second detection signal when the white/black area is scanned, and a third detection signal when the background area is scanned; and
   display signal forming means responsive to the first detection signal for producing the dither converted signal to form the display signal, the display signal forming means being responsive to the second detection signal for mixing the dither converted signal and the binary converted signal to form the display signal, the display signal forming means further being responsive to the third detection signal for producing the binary converted signal to form the display signal.

13. The image reading apparatus as claimed in claim 12, wherein the binary converter includes means for varying the threshold level in accordance with the level of the read signal.

14. The image reading apparatus as claimed in claim 12, wherein the discrimination circuit includes means for producing the first detection signal when the binary converted signal changes alternatively between its first and second levels at intervals of time longer than the time required for the image reader to scan a predetermined number of successive pixels, means for producing the second detection signal when the binary converted signal changes alternatively between the first and second levels at intervals of time shorter than the time required for the image reader to scan the predetermined number of successive pixels.

15. The image reading apparatus as claimed in claim 14, wherein the discrimination circuit includes a background detection circuit for producing a background detection signal when the read signal remains at a background level for a time longer than the time required for the image reader to scan the predetermined number of successive pixels, and means responsive to the background detection signal for producing the third detection signal.

16. The image reading apparatus as claimed in claim 12, which includes means for producing a white background level, means for comparing the read signal with the white background level to produce a white background detection signal when the read signal is equal to or greater than the white background level, and means for replacing the dither converted signal with the white background detection signal.

17. The image reading appartus as claimed in claim 16, which includes means for generating a black background level, means for comparing the read signal with the black background level to produce a black background detection signal when the read signal is smaller than the black background detection signal, and means for replacing the dither converted signal with the black background detection signal.

18. An image reading method for converting an image on a document having background and halftone areas into a display signal, comprising the steps of:
   scanning pixels forming the image to produce a read signal having a level corresponding to the brightness density of each of the scanned pixels;
   generating a dither matrix data signal;
   means for comparing the read signal with the dither matrix data signal to produce a dither converted signal;
   comparing the read signal with a threshold level to produce a binary converted signal having a first level representing a white pixel and a second level representing a black pixel;
   producing a first detection signal in response to the binary converted signal when the halftone area is scanned and a second detection signal when the background area is scanned;
   producing the dither converted signal in response to the first detection signal to form the display signal and producing the binary converted signal in response to the second detection signal to form the display signal.

19. The image reading method as claimed in claim 18, wherein the comparing step comprises the further step of varying the threshold level in accordance with the level of the read signal.

20. The image reading method as claimed in claim 18, wherein the step of producing the first detection signal comprises the further step of producing the first detection signal when the binary converted signal changes alternatively between its first and second levels at intervals of time longer than the time required to scan a predetermined number of successive pixels.

21. The image reading method as claimed in claim 20, wherein the step of producing the first detection signal comprises the further step of storing the binary converted signal at predetermined time intervals to accumulate binary pixel data for the predetermined number of successive pixels, and producing the first detection signal when all of the accumulated binary pixel data represent white or black pixels.

22. The image reading method as claimed in claim 20, wherein the step of producing the first detection signal comprises the further step of producing a background detection signal when the read signal remains at a background level for a time longer than the time required for the image reader to scan the predetermined number of successive pixels, and, in response to the background detection signal, producing the second detection signal.

23. An image reading method for converting an image on a document having background, white/black text and halftone areas into a display signal, comprising the steps of:

scanning pixels forming the image to produce a read signal having a level corresponding to the brightness density of each of the scanned pixels;

generating a dither matrix data signal;

comparing the read signal with the dither matrix data signal to produce a dither converted signal;

comparing the read signal with a threshold level to produce a binary signal having a first level representing a white pixel and a second level representing a black pixel;

producing, in response to the binary converted signal, a first detection signal when the halftone area is scanned, a second detection signal when the white/black area is scanned, and a third detection signal when the background area is scanned; and producing, in response to the first detection signal, the dither converted signal to form the display signal;

mixing, in response to the second detection signal, the dither converted signal and the binary converted signal to form the display signal; and producing, in response to the third detection signal, the binary converted signal to form the display signal.

24. The image reading method as claimed in claim 23, wherein the step of comparing the read signal with a threshold level comprises the further step varying the threshold level in accordance with the level of the read signal.

25. The image reading method as claimed in claim 23, wherein the step of producing the first detection signal comprises the further step of producing the first detection signal when the binary converted signal changes alternatively between its first and second levels at intervals of time longer than the time required to scan a predetermined number of successive pixels and the step of producing the second detection signal comprises producing the second detection signal when the binary converted signal changes alternatively between the first and second levels at intervals of time shorter than the time required for the image reader to scan the predetermined number of successive pixels.

26. The image reading method as claimed in claim 25, wherein the step of producing the third detection signal comprises the steps of producing a background detection signal when the read signal remains at a background level for a time longer than the time required to scan the predetermined number of successive pixels and, in response to the background detection signal, producing the third detection signal.

27. The image reading method as claimed in claim 23, further comprising the steps of producing a white background level, comparing the read signal with the white background level to produce a white background detection signal when the read signal is equal to or greater than the white background level, and replacing the dither converted signal with the white background detection signal.

28. The image reading method as claimed in claim 27, further comprising the steps of generating a black background level, comparing the read signal with the black background level to produce a black background detection signal when the read signal is smaller than the black background detection signal, and replacing the dither converted signal with the black background detection signal.

* * * * *